No. 12,206. REISSUED MAR. 22, 1904.

H. C. INGRAHAM.

THILL COUPLING.

APPLICATION FILED FEB. 16, 1904.

WITNESSES:

C. M. Walker.

C. W. Fowler

INVENTOR

Henry C. Ingraham

BY

T. Walter Fowler

Attorney

THE NORRIS PETERS CO., PHOTO-LITHO., WASHINGTON, D. C.

No. 12,206. Reissued March 22, 1904.

UNITED STATES PATENT OFFICE.

HENRY C. INGRAHAM, OF MOODUS, CONNECTICUT.

THILL-COUPLING.

SPECIFICATION forming part of Reissued Letters Patent No. 12,206, dated March 22, 1904.

Original No. 743,610, dated January 5, 1904. Application for reissue filed February 16, 1904. Serial No. 193,926.

*To all whom it may concern:*

Be it known that I, HENRY C. INGRAHAM, a citizen of the United States, residing at Moodus, in the county of Middlesex and State of Connecticut, have invented new and useful Improvements in Thill-Couplings, of which the following is a specification.

My invention relates to certain new and useful improved means for coupling the thills of a wagon or vehicle to the running-gear thereof; and it consists of the parts and the constructions and combinations of parts which I will hereinafter describe, and point out in the claims.

Figure 1:
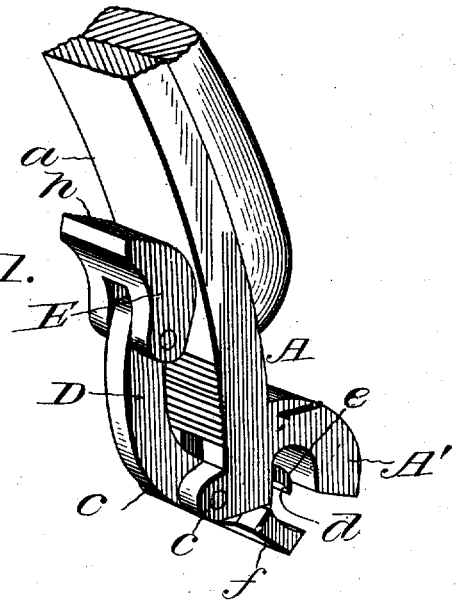
Figure 2:
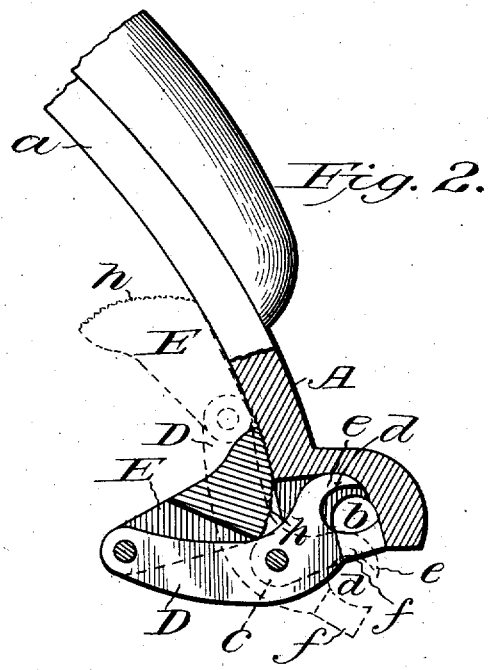

In the accompanying drawings, forming part of this specification, and in which similar letters of reference indicate like parts in both views, Figure 1 is a perspective view of a thill-coupling embodying the salient features of my invention. Fig. 2 is a longitudinal sectional view of the same, the dotted lines showing the open position of the parts.

In said drawings the shaft or pole iron A is made with a stub end *a*, by means of which it is welded, bolted, or otherwise secured to the shaft or pole. The rear end of this iron is enlarged to form a head or projection A′, having a socket or recess *b* in its rear face to receive the coupling-bolt of the usual clip, (not shown,) which is secured to the axle of the vehicle. The projection of the rear end of the iron A to one side of the plane of the main portion thereof and the placing of the socket or recess for this bolt in the intermediate portion of the projection or enlargement allows the wall of the recess to extend far enough over the bolt to preclude the possibility of the latter coming accidentally unhooked. The lower portion of the rear end of the enlargement is forked and formed with the ears *c*, the forked portion opening into the recess *b* for the coupling-bolt. Within said forked portion and pivotally mounted between said ears is a curved lever D, the short arm of which is recessed at *d* to admit the bolt when coupling the thill to the vehicle is desired and when the parts are in the position shown by dotted lines in Fig. 2.

The recessing of the lower end or short arm of the lever provides for the existence of a curved spur or projection *e* at one side of the recess, and which spur or projection enters the fork of the enlargement A and forms a part of the wall of the recess *b* when the parts are closed and the thill coupled, and said spur or projection lies in the entrance of the recess or socket *b* and is first engaged by the bolt when the thill is fitted thereto.

The lever D has its short arm also formed or provided with a transverse bar *f* of a length about equal to the width of the iron A and of such width that it will close into the open rear end of the recess or socket when the bolt is in place, whereby said bolt is securely confined between the wall of the recess and the front face of the bar.

The long arm of the lever D has pivotally secured to its free end one end of a lever E. This lever E is forked at one end to receive the free end of the lever D, and the other portion of said lever E is provided with a curved cam-surface *h*, which engages the surface of the iron A, the said surface and also the cam-face of the lever E being serrated to produce a more effective and locked engagement of the parts and to tightly hold the parts, so that all rattling is avoided. This connection also enables me to compensate for the wear of the parts by more tightly forcing the cam-face of the lever E into engagement with the iron A.

The operation of my device will be readily understood from the following: To attach the thills, the cam-lever is released from its engagement with the iron A, and this lever and the lever D are moved about their pivots and held upon the iron in the position substantially as shown by dotted lines in Fig. 2. In this position the spur or projection *e* is guarding the entrance to the recess *b* and the cross-bar *f* has been swung out of this recess and lies sufficiently clear of the same to allow the bolt to pass thereto. When the parts are in the position shown and the thill is forced into engagement with the bolt, the latter first contacts with the spur or projection *e*, and the hand being removed from the lever D the lever swings about its pivotal connection. When the bolt has fully entered the recess, the cross-bar *f* has closed in behind it, thus confining the bolt between said bar and the front wall of the recess and the spur *e*. The parts may now be locked in this closed position by turning the cam-lever and forcing its serrated cam-face into close engagement with the serrated face of the iron A. Any looseness between the thill-coupling and the bolt may be readily taken up by forcing the cam more intimately into engagement with the iron.

The device described is simple, strong, and effective and may be cheaply constructed. It consists of but three essential parts, does not draw or push into a jointed part, but into a solid enlargement of the iron A, and is instantaneous in operation and will not detach until the cam-lever is lifted out of its engagement with the iron A.

Having thus described my invention, what I claim as new, and desire to secure by Letters Patent, is—

1. In a thill-coupling, the combination of a shaft-iron having its rear end enlarged and provided with a recess to receive the coupling-bolt, a lever pivotally mounted on the shaft-iron and having a short arm provided with a cross-bar to swing into and out of said recess, and a cam-shaped lever pivotally secured to the long arm of the lever and adapted to lock in engagement with the shaft-iron.

2. In a thill-coupling, the combination of a shaft-iron enlarged at its rear end and the intermediate portion of the enlargement recessed to receive the coupling-bolt, a lever pivoted at one side of said recess and having a short arm to enter the same said short arm of the lever provided with a recess and a transverse bar which swings into and out of the recess as the lever is lowered or raised about its pivotal connection, and a lever pivoted to the free end of the first-named lever and having a cam-face to lock into engagement with the shaft-iron.

3. In a thill-coupling the combination of a shaft-iron having an enlargement at its rear end said enlargement recessed in its intermediate portion and having the portion at one side of said recess forked or bifurcated; a lever pivoted within said forked portion and having a short arm to enter said recess said short arm recessed to initially receive the coupling-bolt and having a projecting spur at one side of the recess and a transverse bar at the opposite side thereof said bar adapted to be moved into and out of the recess of the shaft-iron when the lever is rocked about its pivotal connection, and a lever pivotally secured to the free end of the first-named lever and having a cam-face adapted to be forced into locked engagement with the shaft-iron.

4. A thill-coupling comprising a shaft-iron enlarged at the rear and having the intermediate portion of the enlargement recessed to receive the coupling-bolt; a lever pivoted to the shaft-iron at a point at one side of said recess and having a short arm recessed to initially receive said bolt and to form a spur and cross-bar said spur engaged by the entering coupling-bolt to rock the lever and cause the cross-bar to close into the recess of the shaft-iron behind the bolt; and a lever pivotally secured to the free end of the first-named lever and having a cam-shaped end to engage directly with the shaft-iron, said shaft-iron and cam-surface of the lever serrated and adapted to interlock one with the other.

5. In a thill-coupling the combination of a shaft-iron having its rear end extended to one side of the plane of the main portion and provided with a recess for the coupling-bolt, a lever pivotally mounted upon said shaft-iron and having its short arm recessed and adapted to close the entrance to the first-named recess when the coupling-bolt is in place, and a cam-shaped lever pivotally secured to the long arm of the first-named lever and adapted to engage the shaft-iron to secure the parts in a locked position.

In testimony whereof I have hereunto set my hand in presence of two subscribing witnesses.

HENRY C. INGRAHAM.

Witnesses:
EUGENE W. CHAFFEE,
ARTHUR W. CHAFFEE.